(12) United States Patent
Chopra et al.

(10) Patent No.: US 10,769,030 B2
(45) Date of Patent: Sep. 8, 2020

(54) SYSTEM AND METHOD FOR IMPROVED CACHE PERFORMANCE

(71) Applicant: EMC IP Holding Company LLC, Hopkinton, MA (US)

(72) Inventors: Shelesh Chopra, Bangalore (IN); Gururaj Kulkarni, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 215 days.

(21) Appl. No.: 15/962,421

(22) Filed: Apr. 25, 2018

(65) Prior Publication Data
US 2019/0332493 A1 Oct. 31, 2019

(51) Int. Cl.
*G06F 3/06* (2006.01)
*G06F 11/14* (2006.01)
*G06F 16/10* (2019.01)
*G06N 5/04* (2006.01)
*G06F 12/0868* (2016.01)

(52) U.S. Cl.
CPC ...... *G06F 11/1464* (2013.01); *G06F 11/1451* (2013.01); *G06F 11/1453* (2013.01); *G06F 12/0868* (2013.01); *G06N 5/04* (2013.01); *G06F 3/067* (2013.01); *G06F 16/10* (2019.01)

(58) Field of Classification Search
CPC ...... G06F 3/0631; G06F 3/065; G06F 3/0653; G06F 3/067; G06F 3/0683; G06F 11/1448; G06F 11/1451; G06F 11/1453; G06F 11/1464; G06F 12/0868; G06F 16/10; G06N 5/04
See application file for complete search history.

(56) References Cited

U.S. PATENT DOCUMENTS

| | | | |
|---|---|---|---|
| 5,493,689 A | 2/1996 | Waclawsky et al. |
| 5,606,693 A | 2/1997 | Nilsen et al. |
| 5,668,986 A | 9/1997 | Nilsen et al. |
| 6,298,451 B1 | 10/2001 | Lin |
| 6,421,317 B1 | 7/2002 | Denecheau et al. |
| 6,665,812 B1 | 12/2003 | Blumenau et al. |

(Continued)

FOREIGN PATENT DOCUMENTS

EP 2677721 A1 12/2013

OTHER PUBLICATIONS

"Defenders of the Virtual World"; EMC Corporation, EMC Backup, Recovery & Archive Solutions, Backup Recovery Systems Division; Jun. 7, 2012 (59 pages).

(Continued)

*Primary Examiner* — Scott A. Waldron
(74) *Attorney, Agent, or Firm* — Chamberlain, Hrdlicka, White, Williams & Aughtry

(57) ABSTRACT

A coordination point for assigning clients to remote backup storages includes a persistent storage and a processor. The persistent storage includes client type to remote backup storage mappings. The processor obtains a data storage request for data from a client of the clients; obtains an inferential characterization of the client; identifies a type of the client using the inferential characterization of the client; selects a remote backup storage of the remote backup storages based on the identified type of the client using the client type to remote backup storage mappings; and assigns the selected remote backup storage to service the data storage request.

17 Claims, 14 Drawing Sheets

(56) References Cited

U.S. PATENT DOCUMENTS

| | | |
|---|---|---|
| 6,826,711 B2 | 11/2004 | Moulton et al. |
| 7,246,207 B2 | 7/2007 | Kottomtharayil et al. |
| 7,263,529 B2 | 8/2007 | Cordery et al. |
| 7,302,450 B2 | 11/2007 | Benedetti et al. |
| 7,315,923 B2 | 1/2008 | Retnamma et al. |
| 7,343,453 B2 | 3/2008 | Prahlad et al. |
| 7,346,686 B2 | 3/2008 | Albert et al. |
| 7,664,847 B2 | 2/2010 | Colrain et al. |
| 7,954,143 B2 | 5/2011 | Aaron |
| 8,156,086 B2 | 4/2012 | Lu et al. |
| 8,156,502 B1 | 4/2012 | Blanding |
| 8,209,696 B2 | 6/2012 | Ferguson et al. |
| 8,286,174 B1 | 10/2012 | Schmidt et al. |
| 8,375,396 B2 | 2/2013 | Pooni et al. |
| 8,387,054 B1 | 2/2013 | Zeis et al. |
| 8,412,900 B1 | 4/2013 | Sano et al. |
| 8,458,210 B2 | 6/2013 | Arifuddin et al. |
| 8,549,247 B2 | 10/2013 | Satoyama et al. |
| 8,578,120 B2 | 11/2013 | Attarde et al. |
| 8,695,012 B2 | 4/2014 | Kanso et al. |
| 8,782,256 B2 | 7/2014 | Dec et al. |
| 8,965,921 B2 | 2/2015 | Gajic |
| 8,972,326 B2 | 3/2015 | Prathaban et al. |
| 9,069,482 B1 | 6/2015 | Chopra et al. |
| 9,141,435 B2 | 9/2015 | Wein |
| 9,172,750 B2 | 10/2015 | Bulkowski et al. |
| 9,235,579 B1 | 1/2016 | Suarez |
| 9,372,637 B1 * | 6/2016 | Alatorre ............... G06F 16/283 |
| 9,489,270 B2 | 11/2016 | Anglin et al. |
| 9,519,432 B1 | 12/2016 | Haustein et al. |
| 9,672,116 B1 | 6/2017 | Chopra et al. |
| 9,838,332 B1 | 12/2017 | Smith |
| 10,013,189 B1 | 7/2018 | Yang et al. |
| 10,250,488 B2 | 4/2019 | Cropper et al. |
| 10,412,022 B1 | 9/2019 | Tang et al. |
| 10,423,459 B1 | 9/2019 | Jacques de Kadt et al. |
| 2001/0054095 A1 | 12/2001 | Kampe et al. |
| 2003/0224781 A1 | 12/2003 | Milford et al. |
| 2004/0153708 A1 | 8/2004 | Joshi et al. |
| 2004/0186844 A1 | 9/2004 | Muhlestein |
| 2005/0010727 A1 | 1/2005 | Cuomo et al. |
| 2005/0033818 A1 | 2/2005 | Jardin |
| 2005/0149940 A1 | 7/2005 | Calinescu et al. |
| 2006/0101224 A1 | 5/2006 | Shah et al. |
| 2007/0180314 A1 | 8/2007 | Kawashima et al. |
| 2007/0198797 A1 | 8/2007 | Kavuri et al. |
| 2007/0220319 A1 | 9/2007 | Desai et al. |
| 2008/0115190 A1 | 5/2008 | Aaron |
| 2008/0140960 A1 | 6/2008 | Basler et al. |
| 2008/0222297 A1 | 9/2008 | Mengerink |
| 2009/0144388 A1 | 6/2009 | Gross et al. |
| 2009/0164832 A1 | 6/2009 | Kanso et al. |
| 2010/0017445 A1 | 1/2010 | Kobayashi |
| 2011/0022812 A1 | 1/2011 | van der Linden et al. |
| 2011/0153941 A1 | 6/2011 | Spatscheck et al. |
| 2011/0178831 A1 | 7/2011 | Ravichandran |
| 2012/0059934 A1 | 3/2012 | Rafiq et al. |
| 2012/0117028 A1 | 5/2012 | Gold et al. |
| 2012/0204187 A1 | 8/2012 | Breiter et al. |
| 2012/0254443 A1 | 10/2012 | Ueda |
| 2014/0025796 A1 | 1/2014 | Vibhor et al. |
| 2014/0089511 A1 | 3/2014 | McLean |
| 2014/0211698 A1 | 7/2014 | Aguirre et al. |
| 2014/0297611 A1 | 10/2014 | Abbour et al. |
| 2014/0304412 A1 | 10/2014 | Prakash et al. |
| 2014/0331078 A1 | 11/2014 | Cohen |
| 2014/0337285 A1 | 11/2014 | Gokhale et al. |
| 2015/0067353 A1 | 3/2015 | Hui |
| 2015/0067354 A1 | 3/2015 | Hui |
| 2015/0286519 A1 | 10/2015 | Huang et al. |
| 2016/0092311 A1 | 3/2016 | Bushman |
| 2016/0162369 A1 | 6/2016 | Ahn et al. |
| 2016/0378552 A1 | 12/2016 | Taylor et al. |
| 2016/0378614 A1 | 12/2016 | Thanasekaran |
| 2017/0371562 A1 | 12/2017 | Delaney et al. |

OTHER PUBLICATIONS

"EMC® NetWorker® Module for Microsoft for Exchange Server VSS, Release 8.2, User Guide"; EMC Corporation; 2014 (150 pages).

Slota et al.; "Prediction and Load Balancing System for Distributed Storage"; Scalable Computing: Practice and Experience (SCPE); vol. 11, No. 2; pp. 121-130; 2010.

* cited by examiner

SYSTEM AND METHOD FOR IMPROVED
CACHE PERFORMANCE

BACKGROUND

Computing devices generate, use, and store data. The data may be, for example, images, documents, webpages, or meta-data associated with the data. The data may be stored on a persistent storage. Stored data may be deleted from the persistent storage.

Data stored on a computing device may be backed up by storing it on a second computing device. The second computing device may be geographically separated from the computing device.

SUMMARY

In one aspect, a coordination point for assigning clients to remote backup storages in accordance with one or more embodiments of the invention includes a persistent storage and a processor. The persistent storage includes client type to remote backup storage mappings. The processor obtains a data storage request for data from a client of the clients; obtains an inferential characterization of the client; identifies a type of the client using the inferential characterization of the client; selects a remote backup storage of the remote backup storages based on the identified type of the client using the client type to remote backup storage mappings; and assigns the selected remote backup storage to service the data storage request.

In one aspect, a method of operating a coordination point for assigning clients to remote backup storages in accordance with one or more embodiments of the invention includes obtaining a data storage request for data from a client of the clients. The method further includes, without reading the data, obtaining an inferential characterization of the client; identifying a type of the client using the inferential characterization of the client; selecting a remote backup storage of the remote backup storages based on the identified type of the client using client type to remote backup storage mappings; and assigning the selected remote backup storage to service the data storage request.

In one aspect, a non-transitory computer readable medium in accordance with one or more embodiments of the invention includes computer readable program code, which when executed by a computer processor enables the computer processor to perform a method for assigning clients to remote backup storages, the method includes obtaining a data storage request for data from a client of the clients. The method further includes, without reading the data, obtaining an inferential characterization of the client; identifying a type of the client using the inferential characterization of the client; selecting a remote backup storage of the remote backup storages based on the identified type of the client using client type to remote backup storage mappings; and assigning the selected remote backup storage to service the data storage request.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
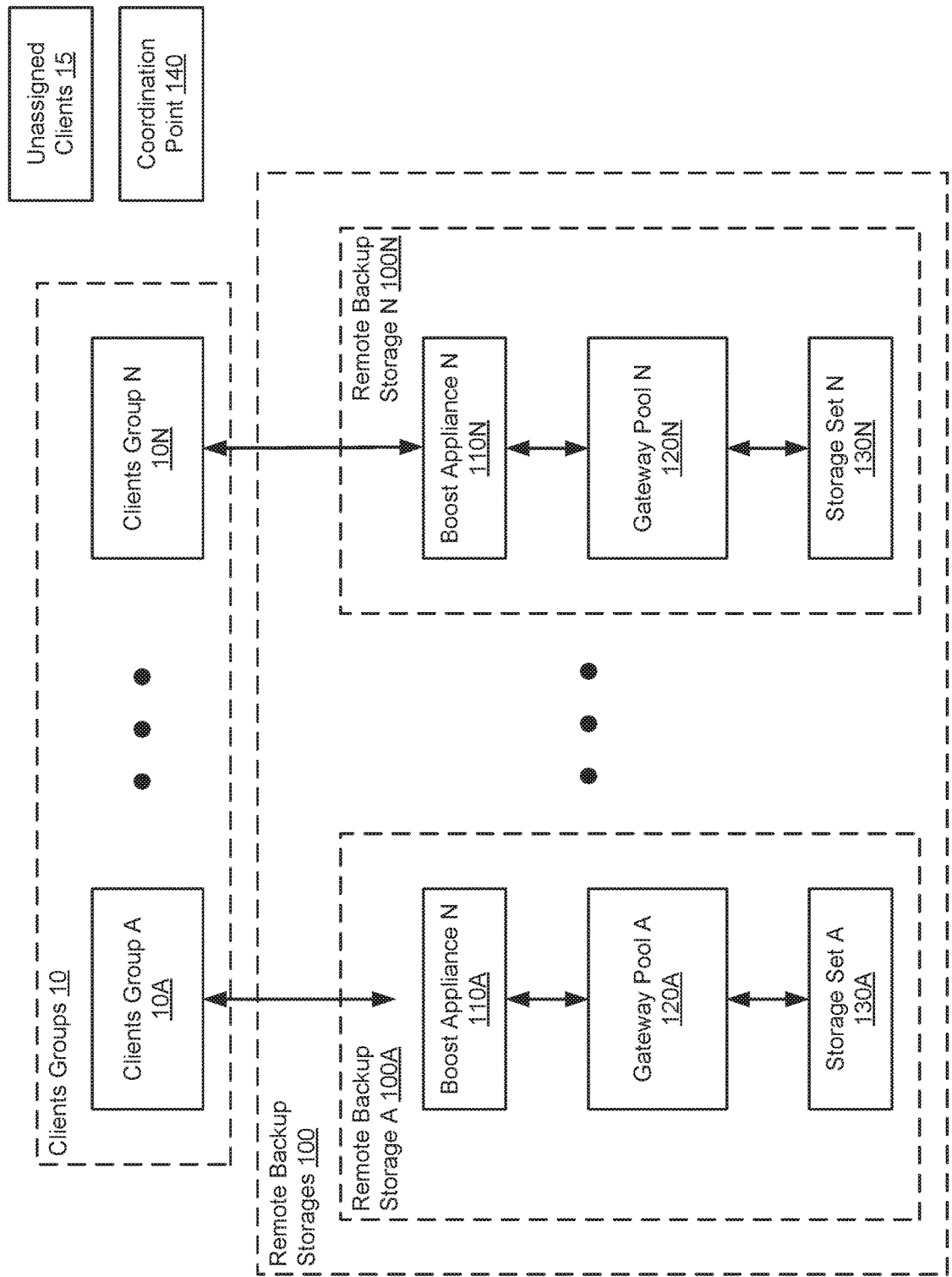
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing data. Managing the data may include storing data from clients in storages. The storages may be remote from the clients. For example, the storages may be operably connected to the clients via a network. Different storages may service the data storage needs of different clients, e.g., a storage may only provide data storage services to a portion of the clients.

In one or more embodiments of the invention, a system may perform an inferential characterization of each client before assigning a remote backup storage to provide data storage services to the client. Clients having similar inferential characterizations may be assigned to the same remote backup storage. Clients having different inferential characterizations may be assigned to different remote backup storages. As will be discussed in greater detail below, the remote backup storage may be deduplicated storages and, consequently, are much more efficient at storing data when each client that stores similar data in the remote backup storage.

Performing an inferential, rather than direct, characterization of a client may enable the system to predict a type of data that the client will store in the backup storage without needing access to the actual data that the client will store. Doing so enables one or more embodiments of the invention to cluster clients that will store similar data for service by a remote backup storage and thereby increase the benefits of deduplication without requiring that the client to provide client data. In a scenario in which the client data is confidential, the aforementioned method of inferentially characterizing a client may improve the data security of the client, e.g., the client need to provide samples or other access to client data as a prerequisite to obtaining data storage services from the backup storages.

In one or more embodiments of the invention, storing data in the storage may consume computing resources. As will be discussed below, deduplicated storages may consume larger amounts of computing resources when different clients storage different types of data in the deduplicated storage. One or more embodiments of the invention may reduce the likelihood of such a scenario from occurring by inferentially characterizing the clients before assignment to a remote backup storage.

As used herein, computing resources refer to processor computing cycles, communication bandwidth, transitory storage input-output cycles, persistent storage input-output cycles, and/or transitory or persistent memory storage capacity. Transitory storage may be provided by, for example, random access memory. Persistent storage memory may be provided by, for example, a solid state hard disk drive. Processor computing cycles may be provided by, for example, a central processing unit. Communication bandwidth may be provided by, for example, a network interface card.

In one or more embodiments of the invention, all clients having a similar inferential characterization are assigned to the same remote backup storage for data storage services. As will be discussed in greater detail below, assigning clients via the aforementioned method may prevent system conditions that result in the high consumption of computing resources when servicing clients.

The aforementioned result is unexpected because the aggregation of similar workloads in a traditional networked storage system typically results in the over utilization of computing resources during certain periods of time and the under utilization of computing resources during other periods of time. In a traditional system, similar workloads would be spread across the system so that the peak computing resource cost of serving the aforementioned workloads are not imposed on the same remote backup storage. Thus, embodiments of the invention may provide a system that assigns clients in a method that is contrary to typical patterns for assignment of workloads to remote backup storages. The aforementioned method of assignment of clients is unconventional because it has the potential of imposing the peak workload of multiple clients to the same remote backup storage.

FIG. 1 shows an example system in accordance with one or more embodiments of the invention. The system may include client groups (10) that store data in remote backup storages (100). Each client group may include any number of clients. Each of the remote backup storages (100A, 100N) may provide data storage services to different client groups (10A, 10N). The system may further include a coordination point (140) that assigns unassigned clients (15) to client groups (10) and/or reassigns clients from one client group to another client group. The unassigned clients (15) may include any number of clients. By assigning the unassigned clients (15) to client groups (10), the coordination point selects a remote backup storage (100A, 100N) that will provide data storage services to the unassigned clients (15). Each of the components of the example system may be operably connected via any combination of wired and wireless connections. Each component of the system is discussed below.

The clients of the client groups (10) and the unassigned clients (15) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients may be other types of computing devices without departing from the invention.

The clients of the client groups (10) may be programmed to store data in the remote backup storages (100). By storing data in the remote backup storages (100), the clients may store backup copies of data and/or reduce the storage utilization rate of the clients.

In one or more embodiments of the invention, the clients store a copy of all or a portion of the respective client's data in the remote backup storages (100). In other words, the remote backup storages (100) may be used to store a copy of the client's data.

Figure 2A:
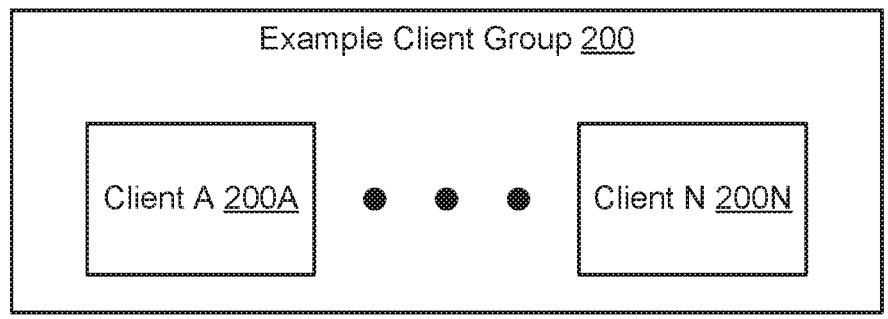
FIG. 2A shows a diagram of an example of client groups in accordance with one or more embodiments of the invention.

In one or more embodiments of the invention, the clients of the client groups store data in the remote backup storages (100) without storing a copy of the data locally. In other words, rather than storing data to a local storage, the clients may store data in the remote backup storages (100) and thereby store the data without using local data storage resources of the client. For additional details regarding the client groups (10), See FIG. 2A.

In one or more embodiments of the invention, each unassigned client (15) may be assigned to a client group (10A, 10N) and programmed to store data in a remote backup storage (100A, 100N) that provides data storage services to the assigned client group. Each client may receive a respective assignment and programming from the coordination point (140). Each unassigned client (15) may be assigned and programmed by the coordination point (140) when the respective unassigned client (15) requests to store data in a remote backup storage (100). Each unassigned client (15) may be assigned at other times, e.g., when first joining the system of FIG. 1, without departing from the invention. Some unassigned clients may remain unassigned until the unassigned clients request to store data.

While each client group (10A, 10N) is illustrated as being serviced, i.e., provided data storage services by a separate remote backup storages (100A, 100N) in FIG. 1, a client group may be serviced by multiple remote backup storages without departing from the invention. For example, a client group may be serviced by multiple remote backup storages. In such a scenario, the storage needs of the client group may be dynamically balanced against the service load on each of the remote backup storages assigned to service the client group. Based on the balancing, the client group may be serviced by any of the assigned remote backup storages to balance the service load across the remote backup storages assigned to service the client group.

As discussed above, the client groups (10) may store data in the remote backup storages (100). The remote backup storages (100) may provide data storage services to client groups. Each remote backup storage (e.g., 110A, 100N) may include a boost appliance (110A, 110N), a gateway pool (120A, 120N), and a storage set (130A, 130N). Each component of the remote backup storages is discussed below.

In one or more embodiments of the invention, the gateways of the gateway pools (120A, 120N) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The gateways of the gateway pools (120A, 120N) may be other types of computing devices without departing from the invention.

In one or more embodiments of the invention, the gateways of the gateway pools (120A, 120N) are distributed computing devices. As used herein, a distributed computing device refers to functionality provided by a logical device that utilizes the computing resources of one or more separate and/or distinct computing devices. For example, in one or more embodiments of the invention, the gateways of the gateway pools (120) may be distributed devices that include components distributed across a number of separate and/or distinct computing devices. In such a scenario, the functionality of the gateways of the gateway pools (120) may be performed by multiple different computing devices without departing from the invention.

In one or more embodiments of the invention, each of the gateways of the gateway pools (120A, 120N) may cooperate with other gateways of the respective pool to provide the functionality of the gateway pools (120A, 120N) described throughout this application. In other words, each gateway of a respective pool may service data storage/access requests from clients assigned to the respective pool, e.g., to provide data storage service a corresponding client group (10A, 10N).

In one or more embodiments of the invention, the gateway pools (120A, 120N) manage client data. The gateway pools (120A, 120N) may manage client data by receiving requests to store client data or by obtain client data from the client groups (10). In response to the requests, the gateway pools (120A, 120N) may take appropriate action to service the aforementioned storage/access requests from the clients. For additional details regarding the gateway pools (120A, 120N), See FIG. 2B.

The gateway pools (120A, 120N) may store client data in respective storage sets (130A, 130N). Each of the storage sets (130A, 130N) may be devices that include physical data storage resources such as, for example, hard disk drives, solid state drives, tape drives, etc. The storage sets (130A, 130N) may provide data storage services to the gateway pools (120A, 120N).

In one or more embodiments of the invention, the storage sets (130A, 130N) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The storage sets (130A, 130N) may be other types of computing devices without departing from the invention.

In one or more embodiments of the invention, the storage sets (130A, 130N) are distributed computing devices. As used herein, a distributed computing device refers to functionality provided by a logical device that utilizes the computing resources of one or more separate and/or distinct computing devices. For example, in one or more embodiments of the invention, the storage sets (130A, 130N) may be distributed devices that include components distributed across a number of separate and/or distinct computing devices. In such a scenario, the functionality of the storage sets (130A, 130N) may be performed by multiple different computing devices without departing from the invention.

The storage sets (130A, 130N) may store client data or provide previously stored client data. The storage sets (130A, 130N) may store or provide client data in response to requests from the gateway pools (120A, 120N). In response to the requests, the storage sets (130A, 130N) may take appropriate action to service the aforementioned storage/access requests from the gateway pools. In some embodiments of the invention, the storage sets (130A, 130N) may also store data received directly from the client groups (10) or provide stored data directly to the client groups (10). For example, the gateway pools (120A, 120N) may orchestrate such a scenario to decrease a load on the respective gateway pool tasked with servicing a data storage/access request from a client. For additional details regarding the storage sets (130A, 130N), See FIG. 2D.

While the storage sets (130A, 130N) are illustrated as being operably connected to separate gateway pools (120A, 120N), multiple storage sets may be operably connected to any combination of gateway pools without departing from the invention. In other words, a storage sets may provide storage services for any number gateway pools.

In one or more embodiments of the invention, the boost appliances (110A, 110N) may facilitate communications between a client group and a gateway pool of the remote backup storage that provides data storage services to the client group.

In one or more embodiments of the invention, the boost appliances (110A, 110N) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The boost appliances (110A, 110N) may be other types of computing devices without departing from the invention.

In one or more embodiments of the invention, the boost appliances (110A, 110N) are distributed computing devices. As used herein, a distributed computing device refers to functionality provided by a logical device that utilizes the computing resources of one or more separate and/or distinct computing devices. For example, in one or more embodiments of the invention, the boost appliances (110A, 110N) may be distributed devices that include components distributed across a number of separate and/or distinct computing devices. In such a scenario, the functionality of the boost appliances (110A, 110N) may be performed by multiple different computing devices without departing from the invention.

As discussed above, the gateway pools (120A, 120N) may manage client data. In one or more embodiments of the invention, the coordination point (140) assigns clients to remote backup storages (110) to service the assigned clients, e.g., a corresponding client group. The coordination point (140) may assign the clients based on an inferential characterization of the clients. Doing so may increase the likelihood that different clients that will store similar data in the remote backup storages (110) are assigned to the same remote backup storage.

In one or more embodiments of the invention, the inferential characterization of the clients identifies a type of a client without interrogating client data. A type of a client may be a grouping of clients that are likely to store similar data. For example, multiple clients that host copies of a database are likely to store similar data. Thus, the inferential characterization enables the coordination point to identify clients that are likely to store similar data in the future. As will be discussed below, the coordination point (140) may assign clients that are likely to store similar data to the same client group. Doing will may improve a deduplication rate of stored data, decrease a computing resource cost of storing the client data, and/or decrease a communication bandwidth used to store client data.

In one or more embodiments of the invention, the inferential characterization of the client may predict a content of the data the client may store. For example, client having different inferential characterizations are likely to be running different types of applications that are likely to generate different types of data. Thus, an inferential characterization of a client may be used to predict a content of the client data.

In one or more embodiments of the invention, the coordination point (140) is a computing device. The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and the methods illustrated in FIGS. 5A-5D. The coordination point (140) may be other types of computing devices without departing from the invention.

In one or more embodiments of the invention, the coordination point (140) is a distributed computing device. For example, the coordination point (140) may be a distributed device that includes components distributed across a number of separate and/or distinct computing devices. In such a scenario, the functionality of the coordination point (140) may be performed by multiple different computing devices without departing from the invention.

In one or more embodiments of the invention, the coordination point (140) assigns clients to be serviced by gateway pools (120). The coordination point (140) may make the assignments to minimize the computing resource cost of servicing the clients. The coordination point (140) may make the assignments based on an inferential characterization of the clients that takes into account one or more of: (i) a state status of the client, e.g., if it is a physical or virtual device, (ii) the file system of the client, (iii) the operating system of the client, and (iv) the storage capacity of the client. The inferential characterization may take into account additional, different or fewer factors without departing from the invention. For additional details regarding the coordination point (140), See FIG. 3.

To further explain the operation of components of the system, FIGS. 2A-2E and 3 show diagrams of examples of components of the system of FIG. 1. While these diagrams illustrate portions of the components of the system, each of the components of the system may include additional, fewer, or different portions without departing from the invention.

Figure 2B:
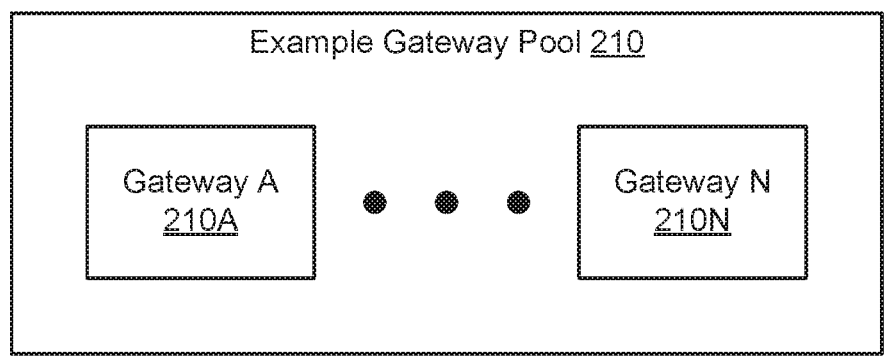
FIG. 2B shows a diagram of an example gateway pool in accordance with one or more embodiments of the invention.

FIG. 2B shows a diagram of an example client group (200) in accordance with one or more embodiments of the invention. The example client group (200) includes clients (200A, 200N). The example client group (200) may include any number of clients without departing from the invention.

Each client of the example client group (200) may be assigned to the example client group (200) by a coordination point. The coordination point may assign clients that are likely to store similar data to the example client group (200). For example, all of the clients (200A, 200N) of the example client group (200) may host instances of an email server that provides email services to employees of a company. The coordination point may have assigned all of the clients (200A, 200N) to the example client group (200) based on an inferential characterization that identified that all of the clients were of a similar type, e.g., an email server type. Since each of the clients of the example hosts an instance of an email server, the inferential characterization identified them as of the same type because each is likely to store similar data.

As discussed above, each client group may be serviced by a gateway pool. FIG. 2B shows a diagram of an example gateway pool (210) in accordance with one or more embodiments of the invention. The example gateway pool (210) includes gateways (210A, 210N). The example gateway pool (210) may include any number of gateways without departing from the invention.

Figure 2C:
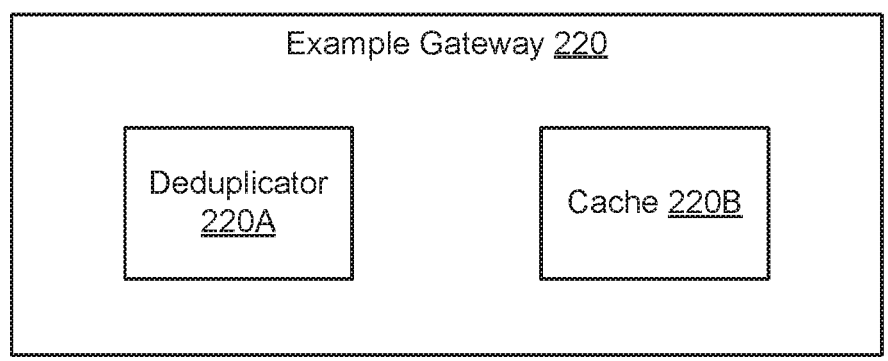
FIG. 2C shows a diagram of an example gateway in accordance with one or more embodiments of the invention.

FIG. 2C shows a diagram of an example gateway (220) in accordance with one or more embodiments of the invention. The example gateway (220) includes a deduplicator (220A) and a cache (220B). Each component of the example gateway (220) is discussed below.

The deduplicator (220A) may obtain client data and deduplicate it against client data already stored in a storage set. In one or more embodiments of the invention, deduplication means to compare to-be-stored data to already stored data and only store a portion of the to-be-stored data that is not identical to already stored data. By deduplicating data a larger quantity of data may be stored using the same quantity of storage. The deduplicator (220A) may perform deduplication using data stored in the cache (220B).

In one or more embodiments of the invention, the deduplicator (220A) is a hardware device. The hardware device may include circuitry. The hardware device may be, for example a programmable gate array, a digital signal processor, or an application specific integrated circuit. The deduplicator (220A) may be other hardware devices without departing from the invention.

In one or more embodiments of the invention, the deduplicator (220A) is implemented as instructions, stored on a persistent storage, that are executed by a processor or other programmable device. The processor or other programmable device may include circuitry. When executing the instructions, the processor or other programmable device may provide the functionality of the deduplicator (220A).

The cache (220B) may store data. The data may be fingerprints of client data stored in the storage set. The fingerprints may be, for example, a hashes of portions of the client data stored in the storage set. When performing deduplication, the deduplicator (220A) may generate a hash of client data and compare it to hashes in the cache (220B) to determine whether a copy of the client data is already stored in the storage set.

In one or more embodiments of the invention, the cache (220B) is a hardware device. The hardware device may include circuitry. The hardware device may be, for example a programmable gate array, a solid state drive, or another high performance memory device. The cache (220B) may be other hardware devices without departing from the invention.

In one or more embodiments of the invention, the cache (220B) is implemented as instructions, stored on a persistent storage, that are executed by a processor or other programmable device. The processor or other programmable device may include circuitry. When executing the instructions, the processor or other programmable device may provide the functionality of the cache (220B).

Figure 2D:
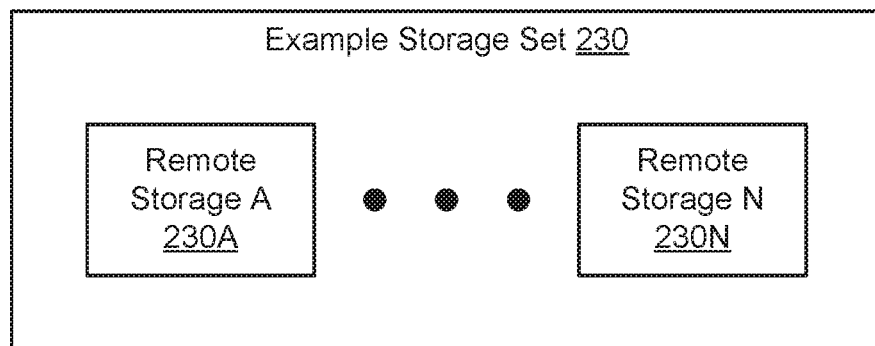
FIG. 2D shows a diagram of an example storage set in accordance with one or more embodiments of the invention.

FIG. 2D shows a diagram of an example storage set (230) in accordance with one or more embodiments of the invention. The example storage set (230) includes any number of remote storages (230A, 230N). In one or more embodiments of the invention, a remote storage is a storage that is not co-located with the clients. Each of the remote storages (230A, 230N) may be physical or virtualized devices that provide storage services to the gateways of the gateway pools. For example, a first remote storage may be a server and a second remote storage may be a cloud resource, i.e., a logical device executing a cloud computing platform.

Figure 2E:
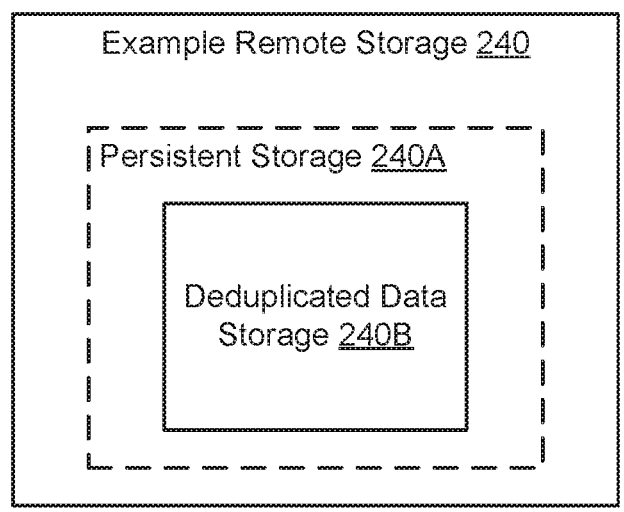
FIG. 2E shows a diagram of an example remote storage in accordance with one or more embodiments of the invention.

FIG. 2E shows a diagram of an example remote storage (240) in accordance with one or more embodiments of the invention. The example remote storage (240) may include a persistent storage (240A). The persistent storage (240A) may host a deduplicated data storage (240B). The example remote storage (240) may store deduplicated data received from the gateways in the deduplicated data storage (240B). The example remote storage (240) may provide data stored in the deduplicated data storage (240B) in response to data access requests from the gateways.

Figure 3:
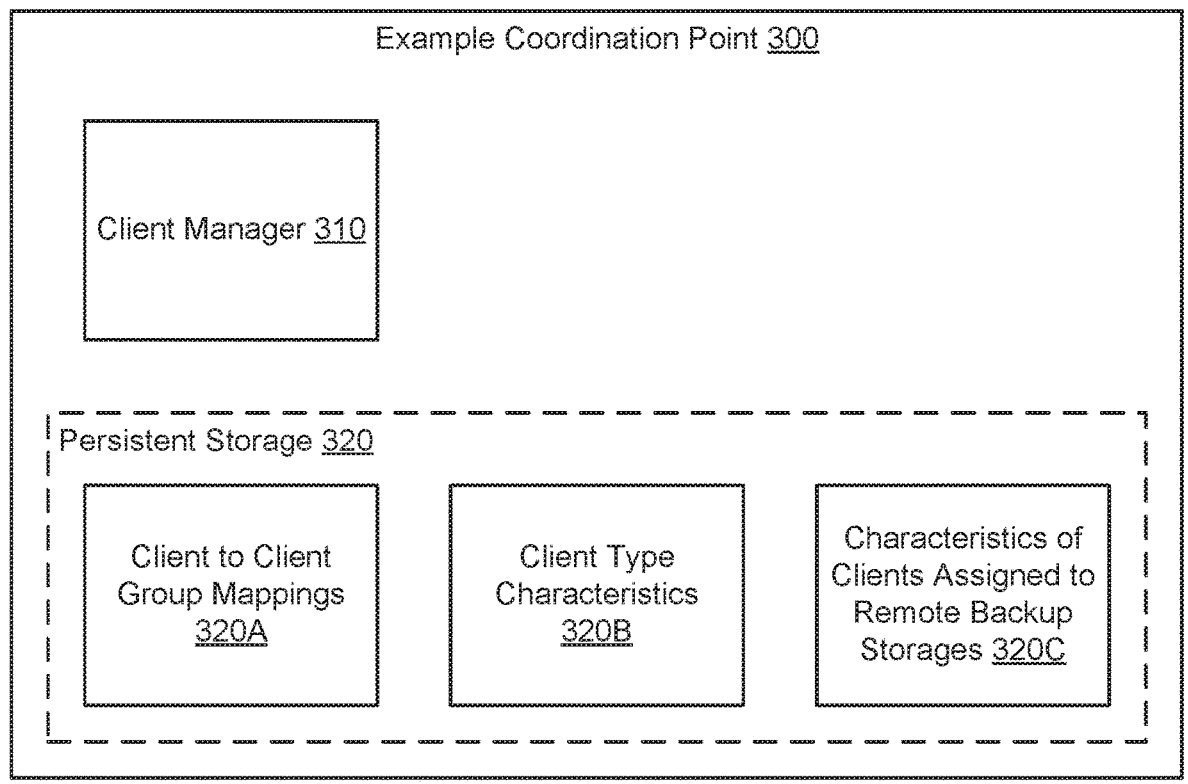
FIG. 3 shows a diagram of an example coordination point in accordance with one or more embodiments of the invention.

FIG. 3 shows a diagram of an example coordination point (300) in accordance with one or more embodiments of the invention. The example coordination point (300) may assign clients to client groups based on inferential characterizations of the clients. The example coordination point (300) may include a client manager (310) and a persistent storage (320). Each component of the example coordination point (300) is discussed below.

The client manager (310) may assign clients to client groups. The client manager (310) may make the assignments based on inferential characterizations of the clients. The inferential characterizations may be stored in the persistent storage (320). To provide the aforementioned functionality, the client manager (310) may perform all or a portion of the methods shown in FIGS. 5A-5D. The client manager (310) may use one or more data structures stored in the persistent storage (320).

In one or more embodiments of the invention, the client manager (310) is a hardware device. The hardware device may include circuitry. The hardware device may be, for example a programmable gate array, a digital signal processor, or an application specific integrated circuit. The client manager (310) may be other hardware devices without departing from the invention.

In one or more embodiments of the invention, the client manager (310) is implemented as instructions, stored on a persistent storage, that are executed by a processor or other programmable device. The processor or other programmable device may include circuitry. When executing the instructions, the processor or other programmable device may provide the functionality of the client manager (310).

The persistent storage (320) may be hardware devices for storing data. The hardware devices may include one or more hard disk drives, solid state drives, and tape drives. The hardware devices may be other types of physical devices for storing data without departing from the invention.

The persistent storage (320) may store data structures used by the client manager (310). The data structures may include client to client group mappings (320A), client type characteristics (320B), and characteristics of clients assigned to remote backup storages (320C). For additional details regarding the aforementioned data structures, See FIGS. 4A-4C.

Figure 4A:
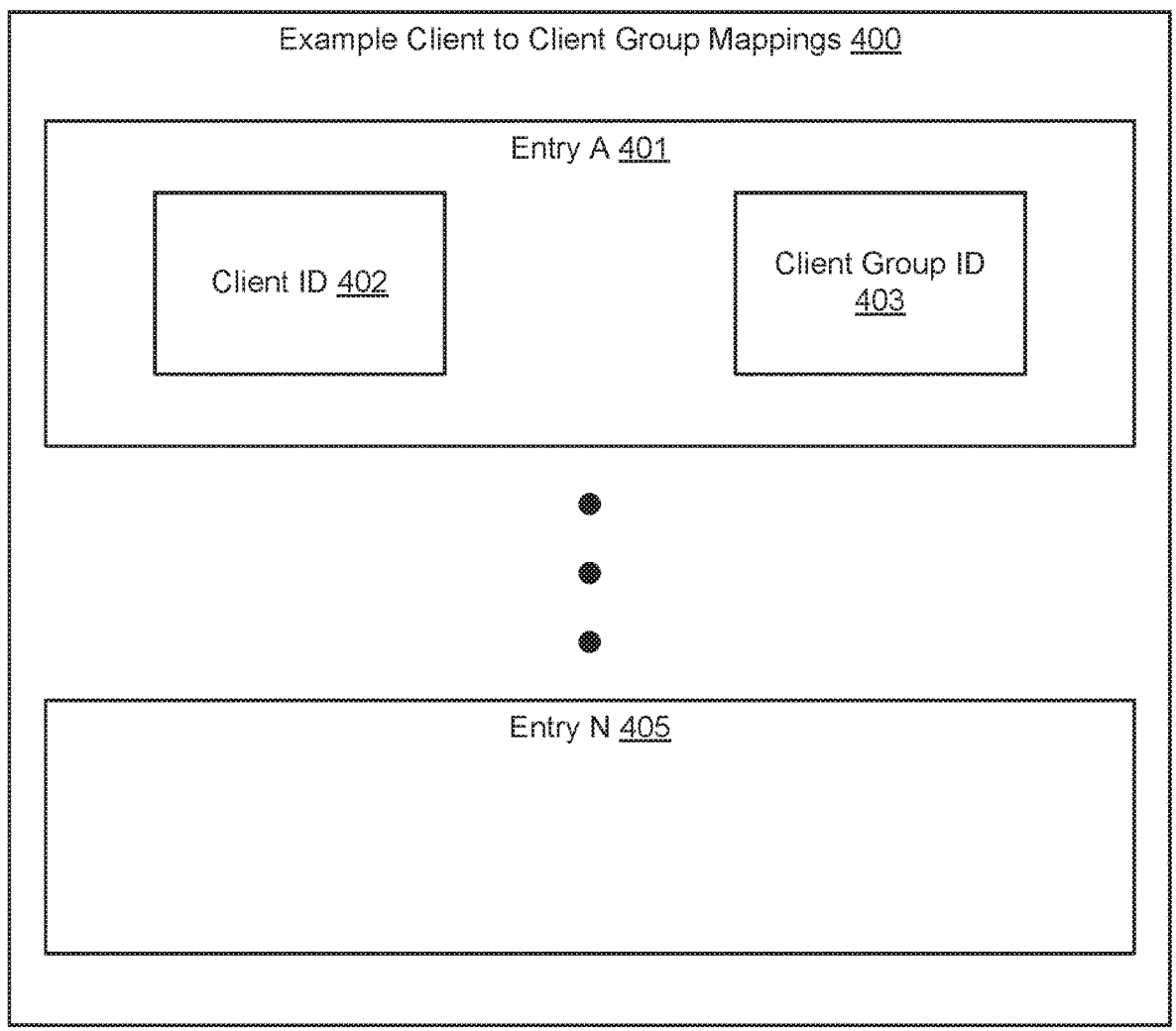
FIG. 4A shows a diagram of example client pool mappings in accordance with one or more embodiments of the invention.

FIG. 4A shows a diagram of example client to client group mappings (400) in accordance with one or more embodiments of the invention. The example client to client group mappings (400) may associate clients with client groups. As discussed above different client groups may be serviced by different remote backup storages and, consequently, assigning a client to a client group, i.e., generating an association between a client and a client group, results in the assigned client being provided data storage services by a corresponding remote backup storage.

In one or more embodiments of the invention, the example client to client group mappings (400) include entries (401, 405). Each entry may specify an association between a client and a client group. In one or more embodiments of the invention, each entry may include a client identifier (402) and a client group identifier (403). Thus, using the entries, a client group for any client may be identified using the example client to client group mappings (400).

Entries of the example client to client group mappings (400) may be generated by a coordination point. For example, when coordination point assigns a client to a client group, the coordination point may update the example client to client group mappings (400) to reflect the assignment. A new entry including an identifier of the assigned client and an identifier of the client group to which the client was assigned may be added to reflect the assignment.

Figure 4B:
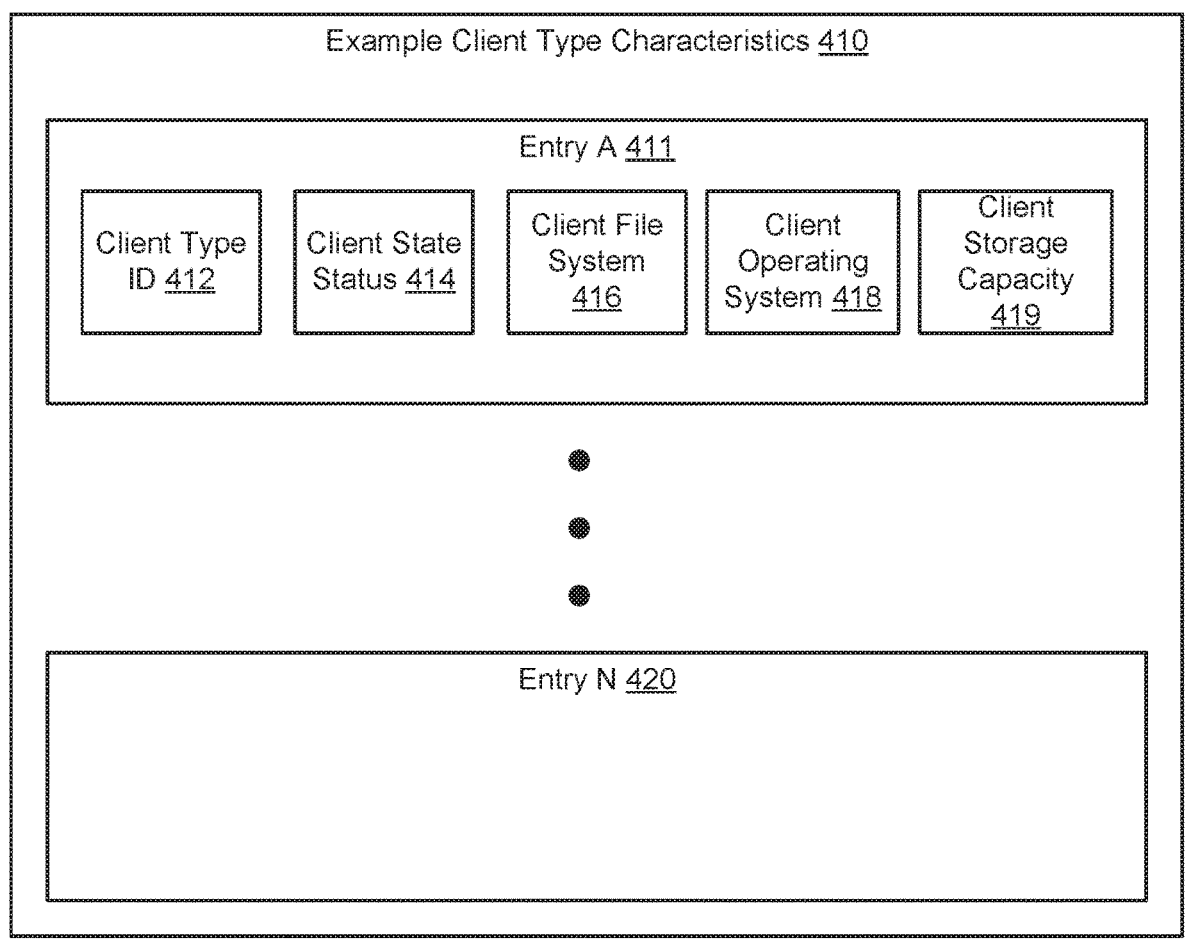
FIG. 4B shows a diagram of example client type in accordance with one or more embodiments of the invention.

FIG. 4B shows a diagram of example client type characteristics (410) in accordance with one or more embodiments of the invention. The example client type characteristics (410) may specify characteristics of each client type. The characteristics may correspond to data that is obtained when an inferential characterization of a client is generated.

In one or more embodiments of the invention, the example client type characteristics (410) include entries (411, 420). Each entry may specify characteristics of a client type. In one or more embodiments of the invention, the entries include one or more of: a client type identifier (412), a client state status (414), a client file system (416), a client operating system (418), and a client storage capacity (419).

The client type identifier (412) may be a name of a client type. The client state status (414) may specify whether the client is a physical or virtual entity. The client file system (416) may specify the file system (e.g., file allocation table, hierarchical file system, new technology file system, second extended file system, etc.) of the client. The client operating system (418) may specify an operating system (Linux, Unix, OSX, Windows, etc.) of the client. The client storage capacity (419) may specify the quantity of persistent storage space (e.g., free disk space, total disk space, etc.) of the client.

Figure 4C:
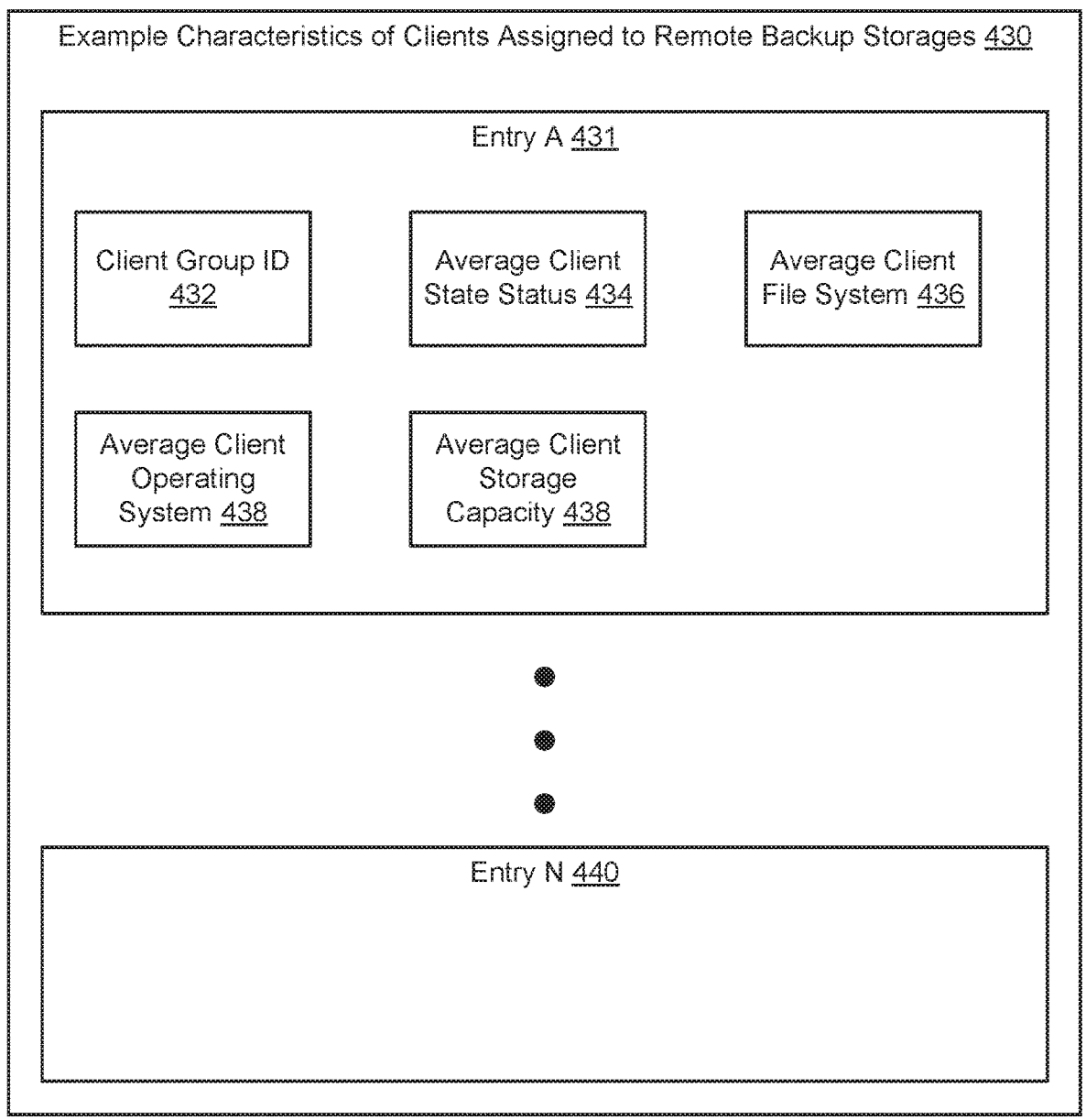
FIG. 4C shows a diagram of example characteristics of clients assigned to remote backup

FIG. 4C shows a diagram of example characteristics of clients assigned to remote backup storages (430) in accordance with one or more embodiments of the invention. The example characteristics of clients assigned to remote backup storages (430) may specify characteristics of each client of a client group. The characteristics may be statistical analysis of the characteristics of the inferential characterization of the clients of the client group.

In one or more embodiments of the invention, the example characteristics of clients assigned to remote backup storages (430) include entries (431, 440). Each entry may specify the statistical analysis of the characteristics of the clients of a client group associated with the entry. In one or more embodiments of the invention, the entries include one or more of: a client group identifier (432), an average client state status (434), an average client file system (436), an average client operating system (438), and an average client storage capacity (439). Each of the aforementioned components of the entry may be based on the inferential characterization of each client of a client group.

For example, the average client state status (434) may be the fraction of clients of a client group that are physical machines, rather than virtual machines. In another example, the average client file system (436) may be the fractional quantity of each operating system of the clients of a client group. While described as averages in FIG. 4C, the components of each entry (431, 440), may be other descriptions of the characteristics of each inferential characterization of the clients of a client group without departing from the invention.

While the data structures illustrated in FIGS. 4A-4C are shown as lists of entries, the data structures may be stored in other formats, may be divided into multiple data structures, and/or portion of the data structure may be distributed across multiple computing devices without departing from the invention.

As discussed above, the coordination point (140, FIG. 1) may assign clients, unassigned clients (15, FIG. 1) or already assigned, to client groups (10, FIG. 1). FIGS. 5A-5D show methods in accordance with one or more embodiments of the invention to perform the assignments. One of ordinary skill will appreciate that some or all of these steps of the methods illustrated in FIGS. 5A-5D may be executed in different orders, may be combined or omitted, and some or all of the steps may be executed in parallel.

Figure 5A:
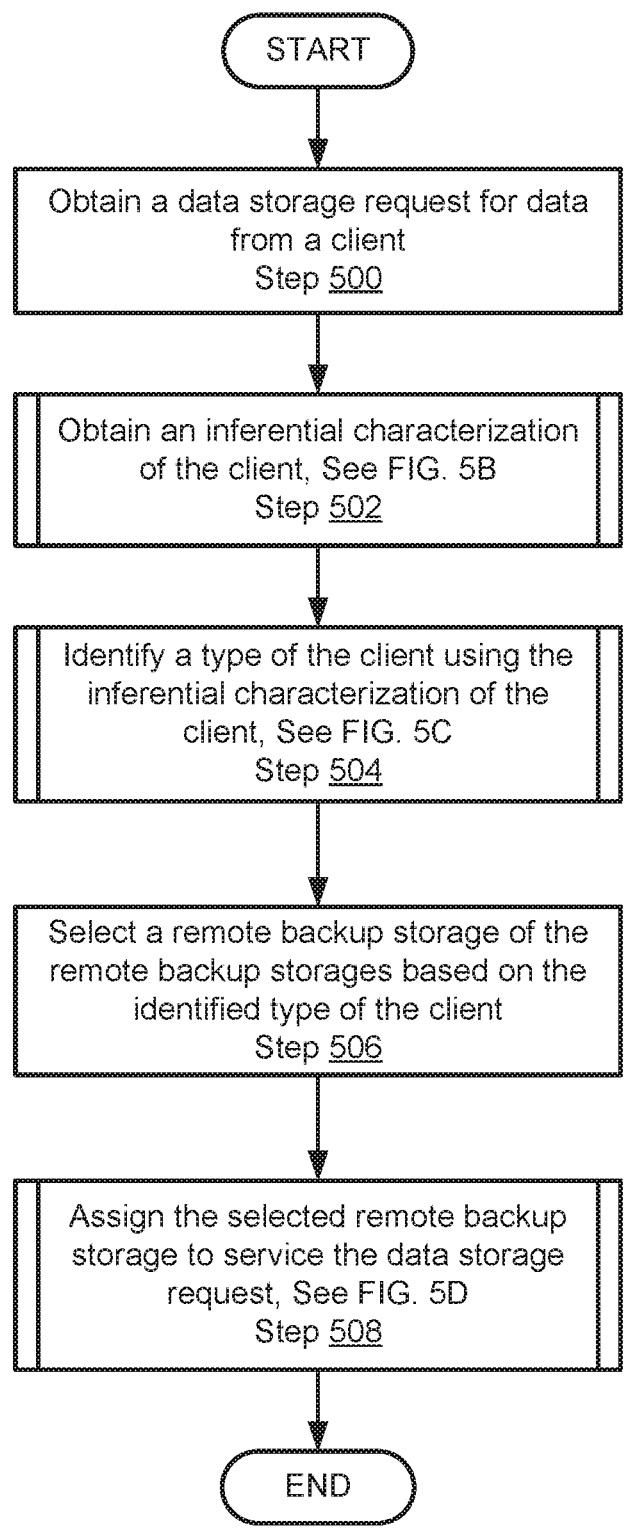
FIG. 5A shows a flowchart of a method of assigning remote backup storages to service clients in accordance with one or more embodiments of the invention.

FIG. 5A shows a flowchart of a method in accordance with one or more embodiments of the invention. The method depicted in FIG. 5A may be used to assign clients to client groups in accordance with one or more embodiments of the invention. The method shown in FIG. 5A may be performed by, for example, a coordination point (140, FIG. 1). Other component of the system illustrated in FIG. 1 may perform the method of FIG. 5A without departing from the invention.

In Step 500, a data storage request for data is obtained from a client.

In one or more embodiments of the invention, the data storage request is obtained directly from the client. For example, the client may send a message including the data storage request.

In one or more embodiments of the invention, the data storage request is obtained indirectly from the client. For example, the data storage request may be sent to a gateway pool which forwards the data storage request to the coordination point.

In one or more embodiments of the invention, the data is any type of data. For example, the data may be a database, a text document, an audio file, a video file, or any other type of data. The database may be one of multiple data base types. For example, a database type may be the model of the database, e.g., relational database, non-relational database, etc. For example, a first database may be relational database and a second database may be a non-relational database. The data may include any quantity of data without departing from the invention.

In one or more embodiments of the invention, the client is an unassigned client. In one or more embodiments of the invention, the client is a client of a client group, i.e., an assigned client.

In Step 502, an inferential characterization of the client is obtained.

In one or more embodiments of the invention, the inferential characterization is obtained by identifying one or more of a state status of the client, a file system of the client, an operating system of the client, and a storage capacity of the client. The state status may reflect whether the client is a physical machine or a virtual machine.

In one or more embodiments of the invention, the inferential characterization is obtained by sending a request to the client. The request may specify the parameters, e.g., state status, file system, operating system, storage capacity, of the inferential characterization. The parameters may be obtained via a response from the client including the parameters.

In one or more embodiments of the invention, the inferential characterization is obtained from a server (not shown) storing the inferential characterization. For example, when a client initially turns on, or at other types, it may send an inferential characterization to the server for storage. By doing so, the load on the client may be shifted to another period of time, as opposed to the time when the client requests to store data, when the client or the coordination point is under low load conditions.

Figure 5B:
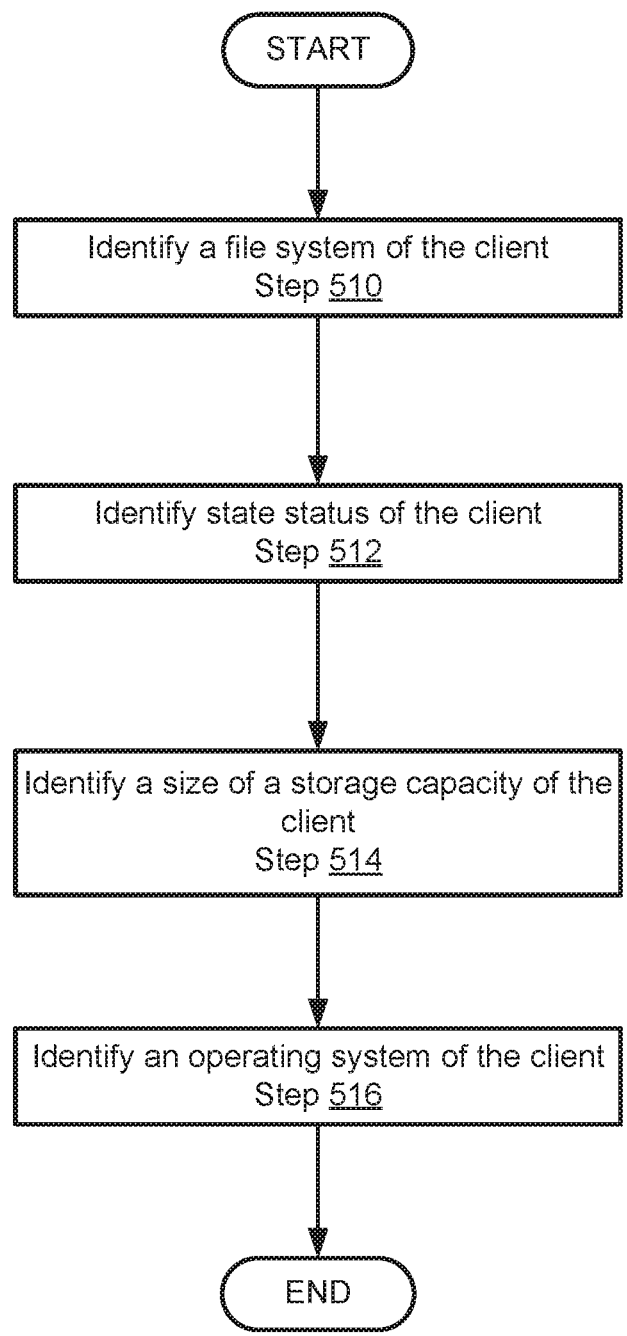
FIG. 5B shows a flowchart of a method of obtaining an inferential characterization of a client in accordance with one or more embodiments of the invention.

In one or more embodiments of the invention, the inferential characterization is obtained via the method illustrated in FIG. 5B. The inferential characterization may be obtained via other methods without departing from the invention.

In Step 504, a type of the client is identified using the obtained inferential characterization of the client.

In one or more embodiments of the invention, the type of the client is identified by matching the parameters of the inferential characterization to the client type characteristics (e.g., 410, FIG. 4B). For example, the parameters may be matched to entries of the client type characteristics. The entry having the best match may be identified as the match. The client type of the matched entry may be used as the identified type of the client.

In one or more embodiments of the invention, the best match may be the entry of the client type characteristics that most closely matched the parameters of the inferential characterization. The closest matched may be the entry that has the smallest absolute difference between the entry's parameters and the parameters of the inferential characterization. Other metrics for determining the closest match may be used without departing from the invention. For example, some parameters may be weighted more heavily than others in computing a closest match. In another example, the closest match may require being an exact match of one parameter and a closest match on the remaining parameters.

Figure 5C:
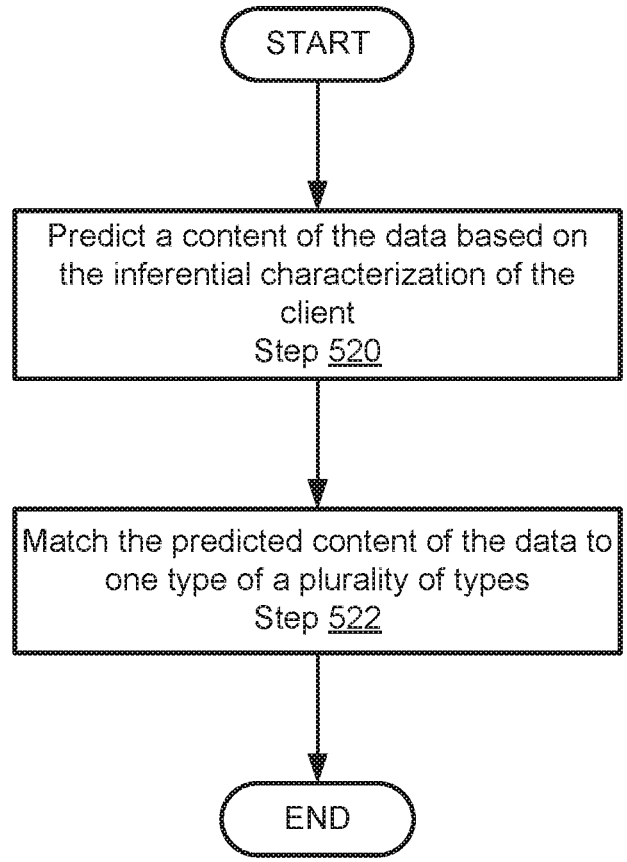
FIG. 5C shows a flowchart of a method of identifying a type of a client in accordance with one or more embodiments of the invention.

In one or more embodiments of the invention, the type of the client may be identified via the method illustrated in FIG. 5C. The client type may be identified via other methods without departing from the invention.

In Step 506, a remote backup storage is selected based on the identified type of the client.

As discussed above, the coordination point may assign similar client types to certain client groups to assign them to be serviced by a particular remote backup storage. By doing so, the coordination point may aggregate clients that are likely to store similar data for service by the particular remote backup storage.

In one or more embodiments of the invention, each client group is associated with a corresponding remote backup storage. The coordination point may select the client to a client group corresponding to a remote backup storage to select the remote backup storage.

In one or more embodiments of the invention, the remote backup storage is selected while a second remote backup storage has a lower client load than the selected remote backup storage. For example, the selected remote backup storage may be servicing ten clients while the second remote backup storage is servicing one client. The aforementioned outcome is unconventional because it places a higher client load on some remote backup storages than other remote backup storages. Conventional approaches may load balance the client load across the remote backup storages. In one or more embodiments of the invention, the approach described here is unconventional because it results in a distribution of clients across the remote backup storages that is unbalanced.

In one or more embodiments of the invention, the workload of a remote backup storage is proportional to the number of clients it is servicing. Remote backup storages having higher client loads, i.e., larger number of clients it services, have higher workloads.

In Step 508, the selected remote backup storage is assigned to service the data storage request.

In one or more embodiments of the invention, the selected remote backup storage is assigned by assigning the client to a corresponding client group that is served by the selected remote backup storage. Once assigned, the client by the selected remote backup storage by virtue of being in the client group served by the selected remote backup storage.

Figure 5D:
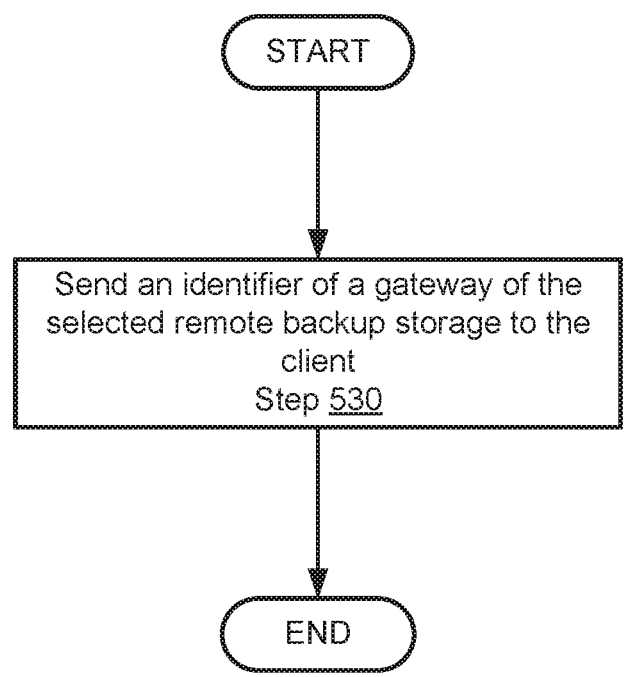
FIG. 5D shows a flowchart of a method of assigning a selected remote backup storage to service a data storage request in accordance with one or more embodiments of the invention.

In one or more embodiments of the invention, the selected remote backup storage is assigned via the method illustrated in FIG. 5D. The selected remote backup storage may be assigned via other methods without departing from the invention.

The method may end following Step 508.

FIG. 5B shows a flowchart of a method in accordance with one or more embodiments of the invention. The method depicted in FIG. 5B may be used to obtain an inferential characterization of a client in accordance with one or more embodiments of the invention. The method shown in FIG. 5B may be performed by, for example, a coordination point (140, FIG. 1). Other component of the system illustrated in FIG. 1 may perform the method of FIG. 5B without departing from the invention.

In Step 510, a file system of the client is identified.

In one or more embodiments of the invention, the file system is identified by sending a request to the client and receiving a response from the client indicating a file system of the client.

In one or more embodiments of the invention, the file system is identified by monitoring communications of the client. For example, a file system of the client may be identified by monitoring a contents, or other characteristics, of communications sent by the client. In this manner, a file system of the client may be identified without directly interacting with or placing a load on the client.

The file system of the client may be identified via different methods without departing from the invention.

In Step 512, a state status of the client is identified.

In one or more embodiments of the invention, the state status is identified by sending a request to the client and receiving a response from the client indicating a state status of the client.

In one or more embodiments of the invention, the state status is identified indirectly. For example, the state status may be identified by identifying multiple clients that resolve to the same end point on a network. Resolving to the same endpoint on a network, as other clients similarly resolve, may indicate that the clients are virtual machines.

The state status of the client may be identified via different methods without departing from the invention.

In Step 514, a size of a storage capacity of the client is identified.

In one or more embodiments of the invention, the size of the storage capacity of the client is identified by sending a request to the client and receiving a response from the client indicating the storage capacity. The storage capacity may be specified as, for example, the total storage capacity of the client or the available storage capacity of the client.

In one or more embodiments of the invention, the storage capacity of the client is identified indirectly. For example, the state status may be identified by identifying multiple clients that resolve to the same end point on a network. Resolving to the same endpoint on a network, as other clients similarly resolve, may indicate that the clients are virtual machines.

The storage capacity of the client may be identified via different methods without departing from the invention.

In Step 516, an operating system of the client is identified.

In one or more embodiments of the invention, the operating system is identified by sending a request to the client and receiving a response from the client indicating a file system of the client.

In one or more embodiments of the invention, the operating system is identified indirectly, i.e., without explicitly requesting that the client identify its operating system. The operating system may be identified indirectly by, for example, monitoring communications of the client. An operating system of the client may be identified by interrogating the content, or other characteristics, of communications sent by the client. In this manner, an operating system of the client may be identified without directly interacting with or placing a load on the client.

The operating system of the client may be identified via different methods without departing from the invention.

The method may end following Step 516.

FIG. 5C shows a flowchart of a method in accordance with one or more embodiments of the invention. The method depicted in FIG. 5C may be used to identify a type of a client in accordance with one or more embodiments of the invention. The method shown in FIG. 5C may be performed by, for example, a coordination point (140, FIG. 1). Other component of the system illustrated in FIG. 1 may perform the method of FIG. 5C without departing from the invention.

In Step 520, a content of the data is predicted based on the inferential characterization of the client.

In one or more embodiments of the invention, the content is predicted based on the parameters of the inferential characterization. For example, the content may be predicted based on a storage capacity of the client. All clients having the same storage capacity may be predicted to have a similar content of data.

In Step 522, the predicted content is matched to a client type associated with the predicted content.

In one or more embodiments of the invention, the match is performed by comparing the predicted content to other predicted content of data of clients of each client type.

The method may end following Step 522.

FIG. 5D shows a flowchart of a method in accordance with one or more embodiments of the invention. The method depicted in FIG. 5D may be used to assign a remote backup storage to service a data storage request in accordance with one or more embodiments of the invention. The method shown in FIG. 5D may be performed by, for example, a coordination point (140, FIG. 1). Other component of the system illustrated in FIG. 1 may perform the method of FIG. 5D without departing from the invention.

In Step 530, an identifier of a gateway of the selected remote backup storage is sent to the client.

In one or more embodiments of the invention, sending the identifier to the client enables the client to communicate with the gateway and, consequently, the remote backup storage of which the gateway is a component.

In one or more embodiments of the invention, sending the identifier to the client automatically assigns the client to a client group served by the remote backup storage of which the gateway is a member.

In one or more embodiments of the invention, sending the identifier of the gateway to the client programs the client to store data in the remote backup storage of which the gateway is a member. For example, the client may be programmed to store data in remote storages as instructed by the coordination point.

The method may end following Step 530.

Figure 6A:
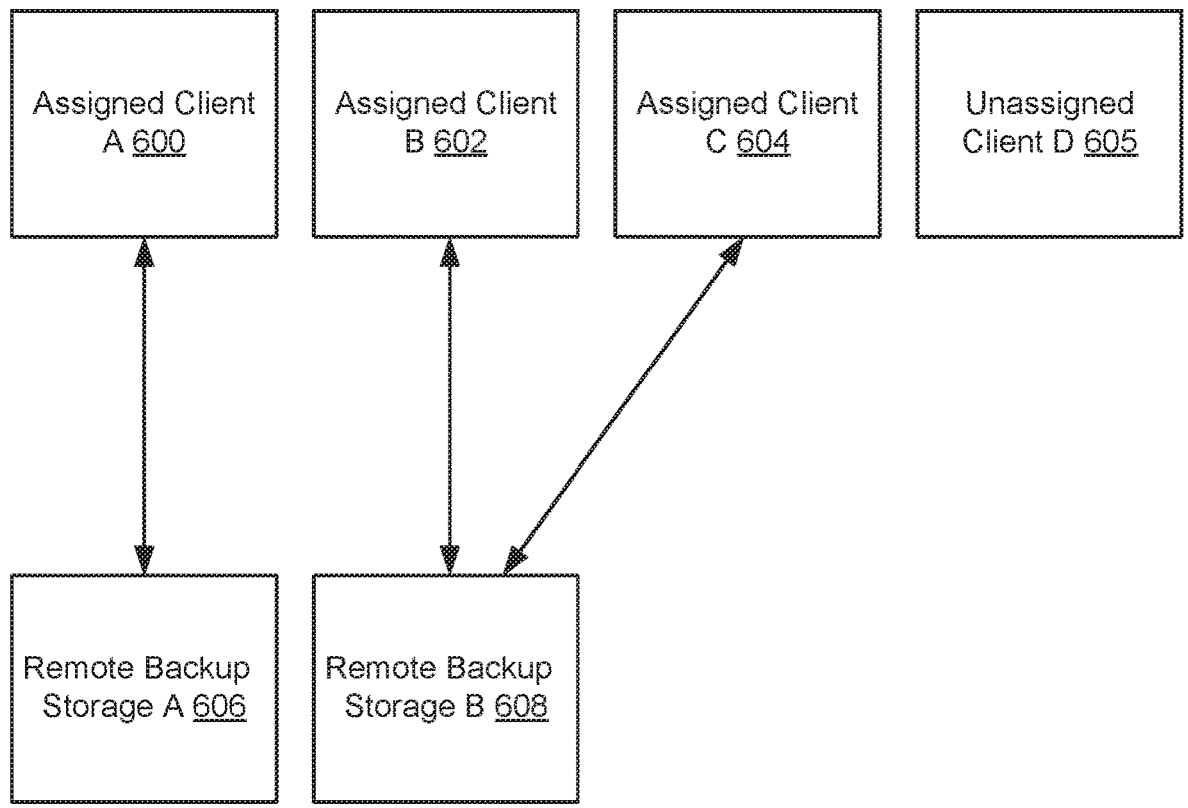
FIG. 6A shows a diagram of an example system.
Figure 6B:
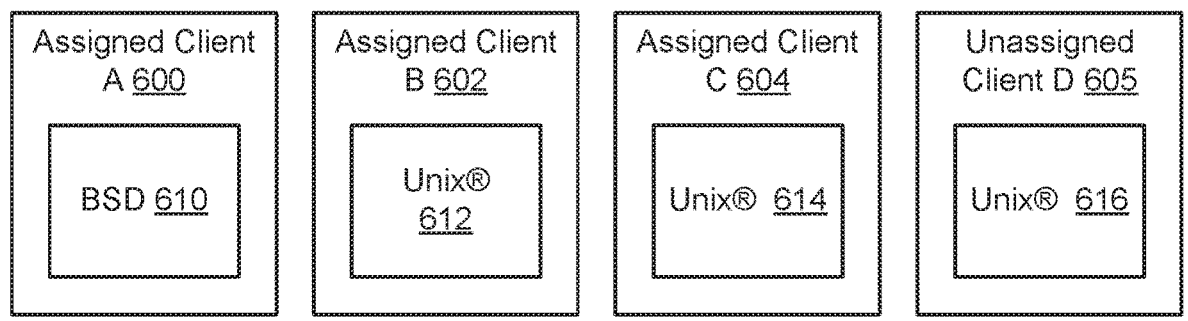
FIG. 6B shows a diagram of the operating system of the clients of the example system of FIG. 5A.
Figure 6C:
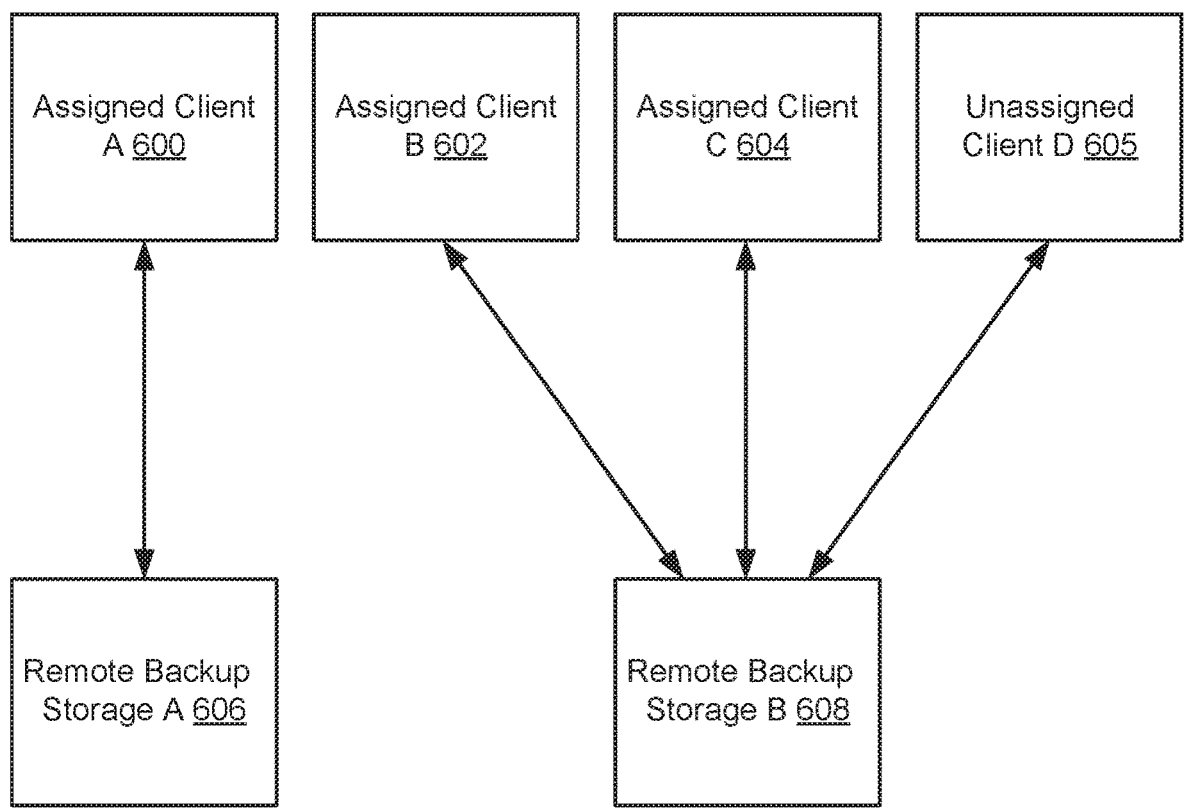
FIG. 6C shows a diagram of the example system of FIG. 5C after the unassigned client is assigned to the remote backup storage for service.
Figure 7:
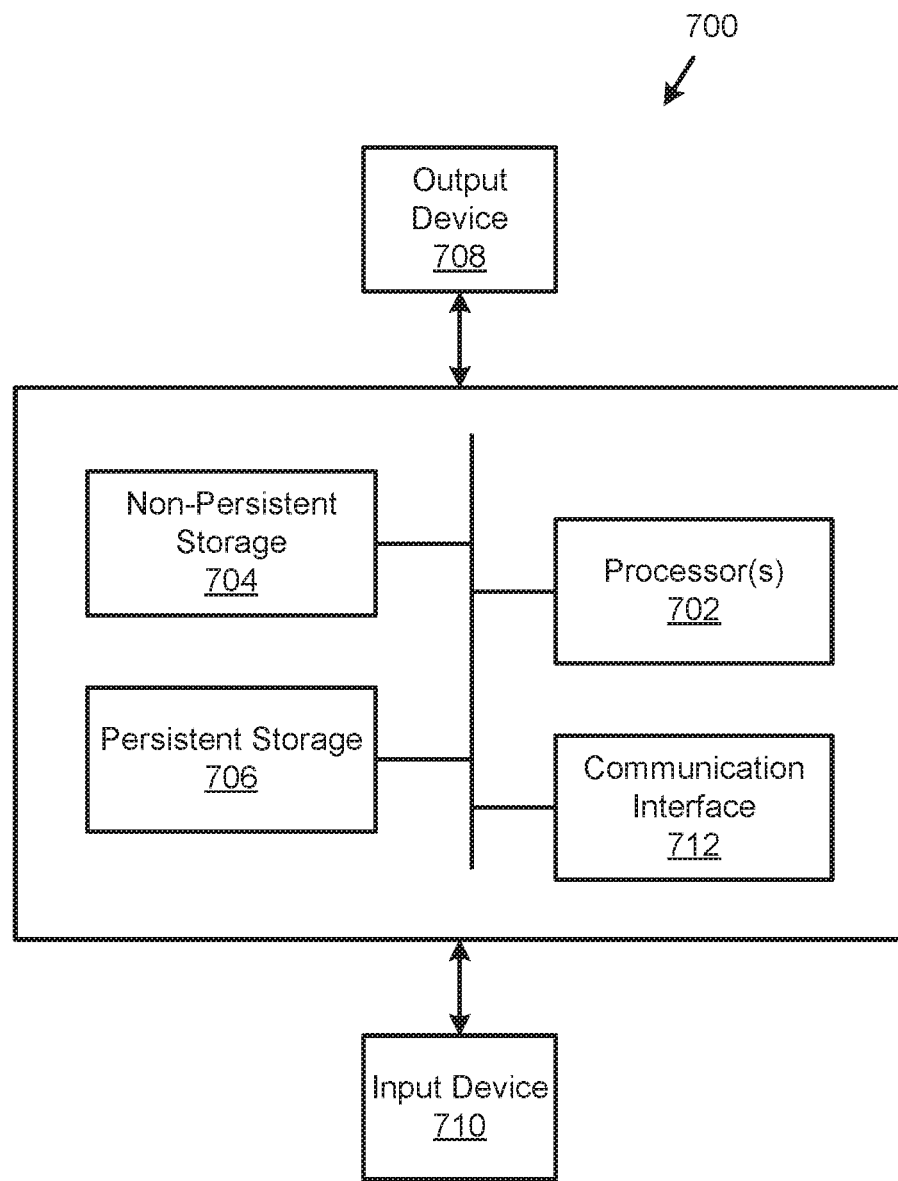
FIG. 7 shows a diagram of a computing device in accordance with one or more embodiments of the invention.

To further explain embodiments of the invention, a non-limiting example is shown in FIGS. 6A-6C.

Example 1

Consider a scenario as illustrated in FIG. 6A where a system includes three clients (600, 602, 604) that have been assigned to store data in remote backup storages (606, 608). Assigned client A (600) stores data in remote backup storage A (606) and assigned clients B and C (602, 604) store data in remote backup storage B (608). Assigned client A (600) may be in a first client group (not shown) and assigned clients B and C (602, 604) may be in a second client group (not shown).

Unassigned client D (605) requests to store data in the system. A coordination point (not shown) may obtain the data storage request.

In response to the data storage request, the coordination point may perform an inferential characterization of unassigned client D (605).

FIG. 6B shows an illustration of the operating systems of the clients (600, 602, 604, and 605). As seen in the figure, assigned client A (600) is running BSD while assigned clients B and C (602, 604) are running Unix. Like assigned clients B and C (602, 604), unassigned client D (605) is also running Unix.

Based on the inferential characterization, the coordination point identifies that the unassigned client D (605) is running Unix. The coordination point then performs a matching of the inferential characterization to the inferential characterizations of the assigned clients. Based on the matching, the coordination point identifies that the unassigned client D (605) is of a client type of assigned clients B and C (602, 604). Specifically, since each of the aforementioned clients is running the same operating system, the coordination point determines that they are of the same client type.

Since unassigned client D (605) is of the same type as assigned clients B and C (602, 604), the coordination point programs the unassigned client D (605) to store data in the remote backup storage B (608) and, thereby, assigns the unassigned client D (605) to be a member of the same client group (not shown) of which assigned clients B and C (602, 604) are a member.

As seen in FIG. 6C, the coordination point assigned the unassigned client D (605) to be serviced by a remote backup storage having a higher workload than other remote backup storages (e.g., 606). This outcome is in contrast to prior system that may attempt to load balance clients across remote backup storages, e.g., assign the same number of clients to be serviced by each remote backup storage.

Example 1 Ends Here.

As discussed above, embodiments of the invention may be implemented using computing devices. FIG. 6 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may address the problem of data storage in a network environment. In a networked environment, client data may be stored in a range of storages. Storing the client data in various deduplicated storages imposes different computing resource usage loads on the system. For example, storing client data in a deduplicated storage that stores data that is dissimilar to the client data may impose a high computing resource load. Embodiments of the invention may decrease a computing resource cost of storing client data by assigning all clients that have a similar inferential characterization to be serviced by a particular remote backup storage. Doing so increases the deduplication factor for storing the data by increasing the likelihood that each of the clients assigned to be serviced by the remote backup storage will store similar data via the storage gateway pool. Thus, embodiments of the invention may improve data storage in a network environment by increasing the deduplication factor of stored data.

Further embodiments of the invention may provide a method of identifying a type of workload that a client is likely to impose on a remote backup storages without interrogating client data. For example, embodiments of the invention may provide a method of performing an inferential characterization of the client that predicts a type of data that a client is likely to store without interrogating the client data. In this manner, embodiments of the invention may improve data security in a network environment reducing the number of components of the system having access to the client data.

The approach described above results in an atypical assignment of clients to gateway pools when compared to contemporary network storage systems that attempt to spread the load of storing data by assigning clients performing similar workloads to different remote backup storages. In particular, when clients are assigned to remote backup storages the client may be assigned to a remote backup storage that is under a heavier load then other remote backup storages. Thus, embodiments of the invention may provide a system that assigns clients to remote backup storages based on the types of workloads imposed on the respective remote backup storages by the clients, as opposed to basing the assignment on the goal of balancing the client load across the remote backup storages.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may enable one or more of the following: i) improve a deduplication factor for storing data in deduplicated storages, ii) improve a data storage capacity of a networked storage topology by actively assigning clients to be serviced by storages already storing data from other clients performing similar workloads, iii) decrease the computing resources used to store data by decreasing the total quantity of storage space used to store client data, and iv) improve network security by enabling clients to be assigned for service without accessing or interrogating the client data.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A coordination point for assigning clients to remote backup storages, comprising:
   a persistent storage comprising client type to remote backup storage mappings; and
   a processor programmed to:
      obtain a data storage request for data from a client of the clients;
      obtain, without reading the data, an inferential characterization of the client;
      identify a type of the client using the inferential characterization of the client, wherein, to identify the type of the client using the inferential characterization of the client, the processor is further programmed to:
         make a prediction of a content of the data based on the inferential characterization of the client, and
         match the predicted content of the data to one type of a plurality of types,
         wherein each type of the plurality of types is associated with a different respective contents;
      select a remote backup storage of the remote backup storages based on the identified type of the client using the client type to remote backup storage mappings; and
      assign the selected remote backup storage to service the data storage request.

2. The coordination point of claim 1, wherein obtaining the inferential characterization of the client comprises:
   identifying a file system of the client.

3. The coordination point of claim 1, wherein obtaining the inferential characterization of the client comprises:
   identifying a state status of the client.

4. The coordination point of claim 1, wherein obtaining the inferential characterization of the client comprises:
   identifying a size of a storage capacity of the client.

5. The coordination point of claim 1, wherein obtaining the inferential characterization of the client comprises:
   identifying an operating system of the client.

6. The coordination point of claim 1, wherein the data is unreadable by the coordination point.

7. The coordination point of claim 1, wherein the remote backup storage is selected while the remote backup storage has a higher workload than a second remote backup storage of the remote backup storages.

8. The coordination point of claim 1, wherein the client type to remote backup storage mappings associate clients of different types with different remote backup storages.

9. The coordination point of claim 1, wherein the type of the client comprises at least one selected from a group consisting of a storage capacity of the client, a file system of the client, an operating system of the client, and a state status of the client.

10. The coordination point of claim 1, wherein assigning the selected remote backup storage to service the data storage request comprises:
sending an identifier of a gateway of the selected remote backup storage to the client.

11. The coordination point of claim 1, wherein the processor is further programmed to:
obtain a second data storage request for second data from a second client of the clients;
obtain a second inferential characterization of the second client;
identify a second client type of the second client using the second inferential characterization;
select a second remote backup storage of the remote backup storages based on the identified second client type of the second client using the client type to remote backup mappings; and
assign the selected second remote backup storage to service the second data storage request.

12. The coordination point of claim 11, wherein the data is of a first database type and the second data is of a second database type.

13. The coordination point of claim 12, wherein the client type and the second client type are different.

14. The coordination point of claim 11, wherein the data is of a first database type and the second data is of the first database type.

15. The coordination point of claim 14, wherein the client type and the second client type are different.

16. A method of operating a coordination point for assigning clients to remote backup storages, comprising:
obtaining a data storage request for data from a client of the clients;
without reading the data:
obtaining an inferential characterization of the client;
identifying a type of the client using the inferential characterization of the client, wherein, identifying the type of the client using the inferential characterization of the client comprises:
making a prediction of a content of the data based on the inferential characterization of the client, and
matching the predicted content of the data to one type of a plurality of types,
wherein each type of the plurality of types is associated with a different respective contents;
selecting a remote backup storage of the remote backup storages based on the identified type of the client using client type to remote backup storage mappings; and
assigning the selected remote backup storage to service the data storage request.

17. A non-transitory computer readable medium comprising computer readable program code, which when executed by a computer processor enables the computer processor to perform a method for assigning clients to remote backup storages, the method comprising:
obtaining a data storage request for data from a client of the clients;
without reading the data:
obtaining an inferential characterization of the client;
identifying a type of the client using the inferential characterization of the client, wherein, identifying the type of the client using the inferential characterization of the client comprises:
making a prediction of a content of the data based on the inferential characterization of the client, and
matching the predicted content of the data to one type of a plurality of types,
wherein each type of the plurality of types is associated with a different respective contents;
selecting a remote backup storage of the remote backup storages based on the identified type of the client using client type to remote backup storage mappings; and
assigning the selected remote backup storage to service the data storage request.

* * * * *